United States Patent [19]
Cheng

[11] Patent Number: 5,563,455
[45] Date of Patent: Oct. 8, 1996

[54] METHOD AND APPARATUS FOR SEQUENCING AND CONTROLLING POWER DISTRIBUTION

[75] Inventor: Chin Y. Cheng, Cupertino, Calif.

[73] Assignee: Sun Microsystems, Inc., Mountain View, Calif.

[21] Appl. No.: 394,803

[22] Filed: Feb. 27, 1995

[51] Int. Cl.$^6$ .................................................. H02J 3/14
[52] U.S. Cl. .......................... 307/41; 307/38; 364/273; 364/273.1; 364/273.2; 364/273.3; 364/273.4; 364/273.5
[58] Field of Search ............... 307/41, 38; 364/492, 364/273, 273.1, 273.2, 273.3, 273.4, 273.5

[56] References Cited

U.S. PATENT DOCUMENTS

| | | | |
|---|---|---|---|
| 3,521,130 | 3/1968 | Davis | 317/139 |
| 3,723,827 | 3/1973 | Griswold et al. | 317/137 |
| 3,725,675 | 4/1973 | Olsen | 307/238 |
| 3,729,671 | 4/1973 | Jeffery et al. | 321/11 |
| 4,890,212 | 12/1989 | Kumon et al. | 363/49 |

OTHER PUBLICATIONS

*LM 1851 Ground Fault Interrupter*, National Semiconductor Corporation.

*Primary Examiner*—William M. Shoop, Jr.
*Assistant Examiner*—Albert W. Paladini
*Attorney, Agent, or Firm*—Blakely Sokoloff Taylor & Zafman

[57] ABSTRACT

Methods and apparatus for operating a power sequencer/controller system are disclosed. In a typical operation, an AC power sequencer/controller of the present invention senses the current through a first outlet connected to a first load, and when the current through the first outlet exceeds a first threshold voltage, indicating that the first load is turned on, the AC power sequencer/controller provides power to a second outlet so that a second load connected to the second outlet can be turned on. A power sequencer/controller of the present invention includes at least (a) a master outlet for coupling to a first load, (b) a current sensor for sensing the current through the master outlet and for coupling to a power source, (c) a switch controller for receiving a signal from the current sensor, a DC power supply or an input from a second power sequencer/controller, (d) a switch controlled by the switch controller and for coupling to the power source, and (e) a slave outlet coupled to the switch and for coupling to a second load. Multiple power sequencers/controllers can be also cascaded. While a master outlet may be always powered, a slave outlet of a power sequencer/controller can be either always powered, controlled (a) by one of the master outlet or a slave outlet of the same power sequencer/controller or (b) by a master outlet or a slave outlet of another power sequencer/controller in a cascaded system.

19 Claims, 11 Drawing Sheets

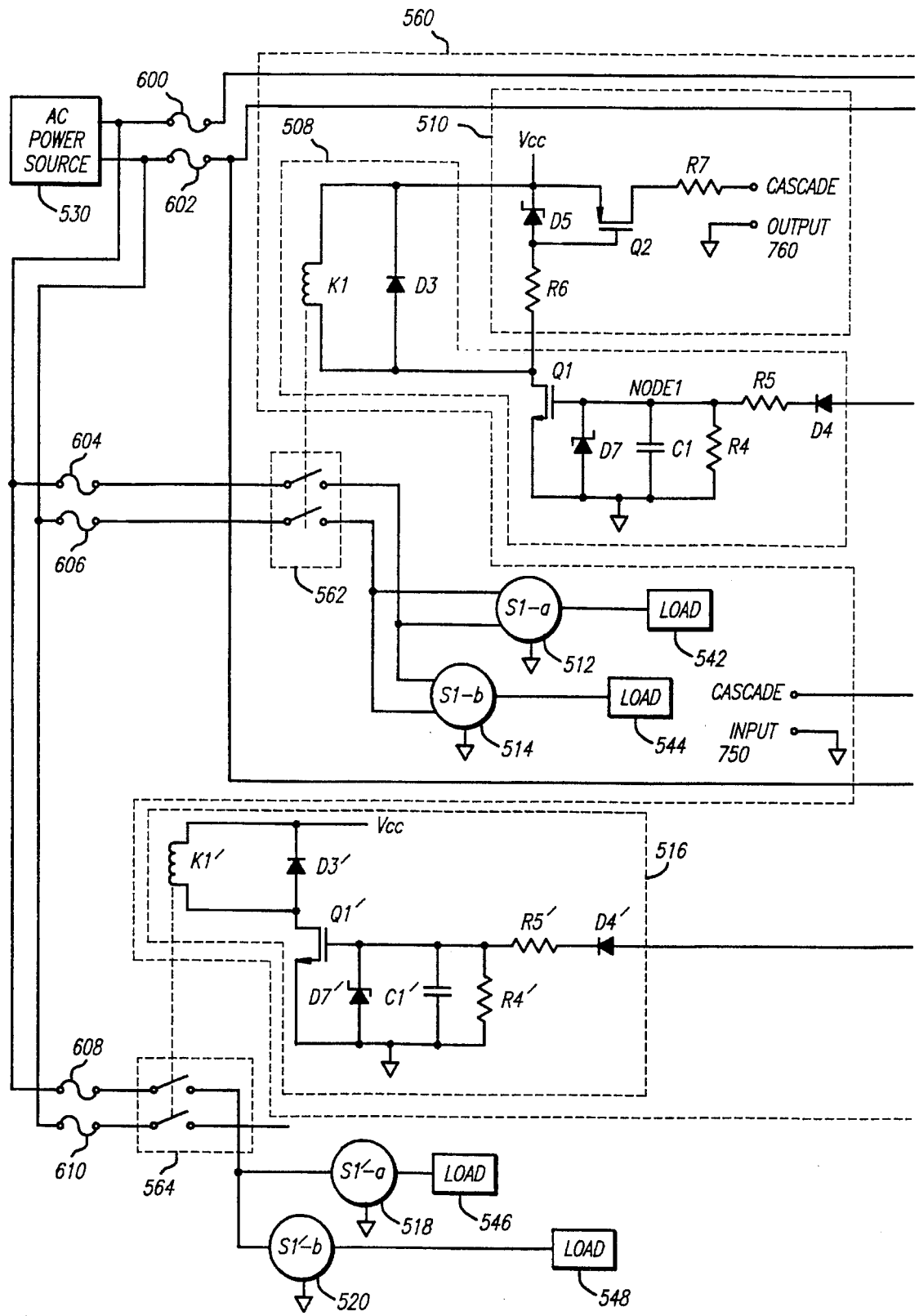
FIG. 4b(1)

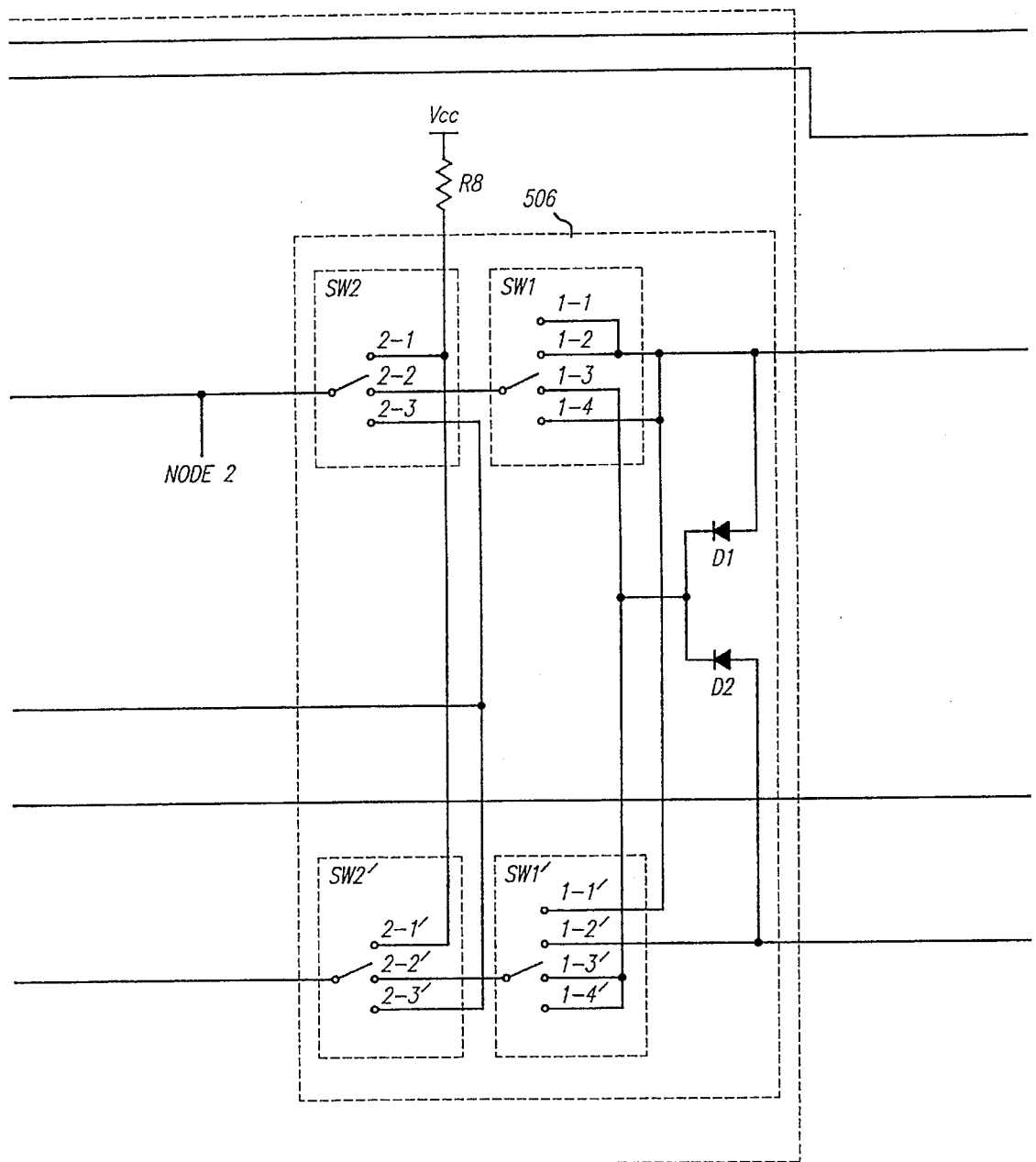
FIG. 4b(2)

FIG. 4b(3)
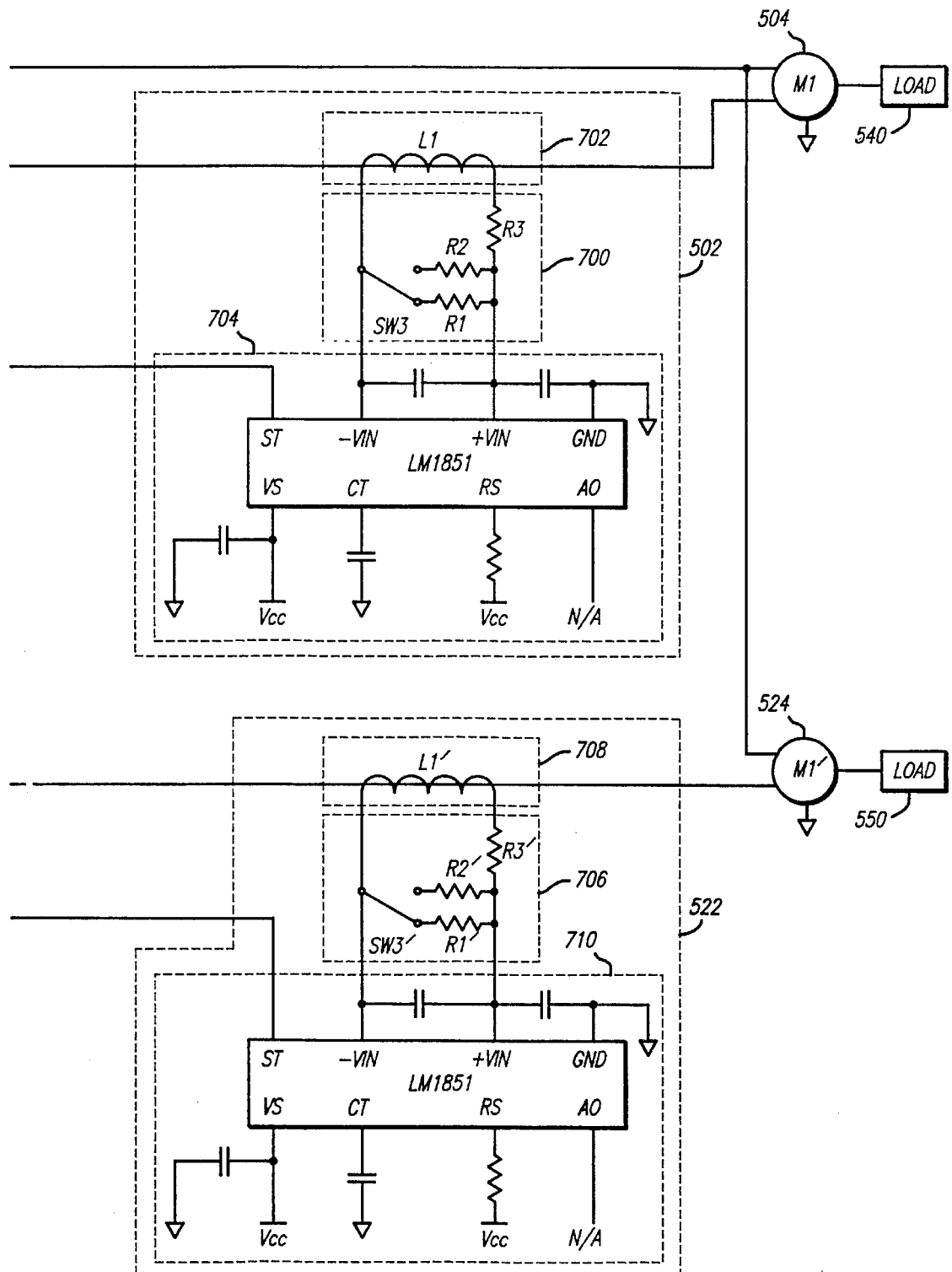

METHOD AND APPARATUS FOR SEQUENCING AND CONTROLLING POWER DISTRIBUTION

BACKGROUND OF THE INVENTION

1. Field of the Invention

The present invention relates to the field of power distribution, sequencing and controlling and, more particularly, to alternating current (AC) power distributors, sequencers and controllers.

2. Description of the Related Art

FIG. 1 shows a prior art AC power sequencer/controller 20 coupled to a load 23 which is, in this example, a computer system. AC power sequencer/controller 20 has multiple electrical outlets such as Ma 24, Sa 25, Sb 26, Sc 27 and Sd 28 that are connected to various electrical devices (e.g., a computer host 10, a printer 12, a modem 13, a display monitor 14 and an external storage device 15). AC power sequencer/controller 20 controls providing power from an AC power unit 22 to the electrical outlets 24, 25, 26, 27 and 28 so that the electrical devices 10, 12, 13, 14 and 15 can be turned on/off in sequence. AC power unit 22 can be an AC outlet or other AC power source.

In the computer system shown in FIG. 1, it may be desirable to provide power to or disconnect power from the master unit (Ma 24) first and then the slave units (Sa 25, Sb 26, Sc 27 and Sd 28). To perform this task, prior art AC power sequencer/controller 20 includes a feedback cable 21 coupled between computer host 10 and Ma 24 to ensure that peripherals 11 including printer 12, modem 13, display monitor 14 and external storage device 15 are turned on/off after computer host 10 is turned on/off. The sequence of an operation may include the following: after AC power sequencer/controller 20 provides power to computer host 10, AC power sequencer/controller 20 waits for a feedback signal from computer host 10 through feedback cable 21 notifying AC power sequencer/controller 20 that computer host 10 is turned on. Upon receiving the feedback signal, AC power sequencer/controller 20 provides power to peripherals 11. A similar procedure can be adopted for removing power from the computer system.

While AC power sequencer/controller 20 is used to turn on/off computer host 10 and peripherals 11 in sequence, it can also be used to minimize power surges in a server system. The prior art AC power sequencer/controller 20 having feedback cable 21 may be utilized in a server (or a rack) system which may include many switching power supplies. Without an AC power sequencer/controller, a huge in-rush current can flow when AC power is applied to the server system. It is easy to trip a circuit breaker either in the server system or on a user's AC power supply panel if all the power supplies are turned on at the same time. A feedback cable is provided in such a server system to turn on various system components at different times instead of turning them on all at once to reduce the amount of power surge.

The drawbacks of these prior art solutions include the cost and low reliability of the feedback cable(s).

The present invention provides a method and apparatus for controlling and sequencing AC power distribution by sensing the current through various electrical outlets rather than using one or more feedback cables.

SUMMARY OF THE INVENTION

The present invention provides an AC power sequencer/controller that senses the current through a first outlet that is connected to a first load, and when the current through the first outlet exceeds a first threshold current, indicating that the first load is turned on, the AC power sequencer/controller provides power to a second outlet so that a second load connected to the second outlet can turn on.

A power sequencer/controller of the present invention includes at least (a) a master outlet for coupling to a first load, (b) a current sensor for sensing the current through the master outlet and for coupling to a power source, (c) a switch controller for receiving a signal from the current sensor, a DC power supply or an input from a second power sequencer/controller, (d) a switch controlled by the switch controller and for coupling to the power source, and (e) a slave outlet coupled to the switch and for coupling to a second load.

While a master outlet is always powered when the power sequencer/controller is coupled to a power source, a slave outlet of the power sequencer/controller can be either always powered, controlled (a) by one of the master outlet or a slave outlet of the same power sequencer/controller or (b) by a master outlet or a slave outlet of another power sequencer/controller in a cascaded system.

The current sensor of the present invention may include (a) a threshold current level selector, which may be resistors connected in parallel and/or in series, for selecting an appropriate threshold current level for a given load, (b) a current-to-voltage converter, which may be an inductor, for detecting the current through the main outlet and for developing a voltage across the inductor, and (c) a voltage detection/conversion circuit that receives one voltage level from the current-to-voltage converter and outputs another voltage level that is appropriate for the switch controller.

The switch controller may include (a) a mode selector for selecting a mode of operation, (b) a slave controller for closing and opening the switch connected to the slave outlet and (c) a cascade circuit for providing a voltage signal for a second AC power sequencer/controller in a cascade system.

The mode selector allows the slave outlets to be controlled by one of (a) a master outlet, (b) another slave outlet, (c) a DC power supply in which case the slave outlet is always powered, and (d) another power sequencer/controller.

The slave controller may include a delay circuit for delaying closing and opening of the switch and a first transistor for providing current to an inductor that develops a magnetic field to close the switch, The cascade circuit may include a second transistor that turns on/off when the first transistor turns on/off. The second transistor is coupled to the DC power supply and an output port for sending a signal to another power sequencer/controller in the cascade system.

BRIEF DESCRIPTION OF THE DRAWINGS

FIG. 2a is a block diagram of an AC power sequencer/controller having one main outlet and one slave outlet according to a first embodiment of the present invention wherein power is provided to the slave outlet when the current through the main outlet exceeds a threshold current level, indicating that the load connected to the main outlet is turned on.

FIG. 4b is a schematic diagram of the AC power sequencer/controller shown in FIG. 4a.

DETAILED DESCRIPTION OF THE INVENTION

FIGS. 2a–2e illustrate various AC power sequencer/controllers that may be implemented according to the present invention. Those shown in FIGS. 2a–2e are for illustration purposes only, and there may be numerous other embodiments that utilize various features of the present invention. The present invention describes power sequencer/controllers mainly with reference to AC power. However, it should be noted that the present invention may be utilized to distribute DC power as well.

In the following descriptions, a master outlet can be directly connected to the power source so that if a first load is coupled to a master outlet, the first load can be turned on or off independent of the current drawn through other master outlets, slave outlets or loads. A slave outlet is connected to the power source through a switch which is controlled (a) by the current through a master outlet or another slave outlet of the same power sequencer/controller so that a second load can be turned on only after power to the load connected to the master outlet or the other slave outlet is turned on, (b) by the current through a master outlet or another slave outlet of another power sequencer/controller or (c) by a fixed voltage so that the switch is always closed to provide power to the slave outlet.

BLOCK DIAGRAMS OF VARIOUS EMBODIMENTS

One Master Outlet and One Slave Outlet

Figure 1:
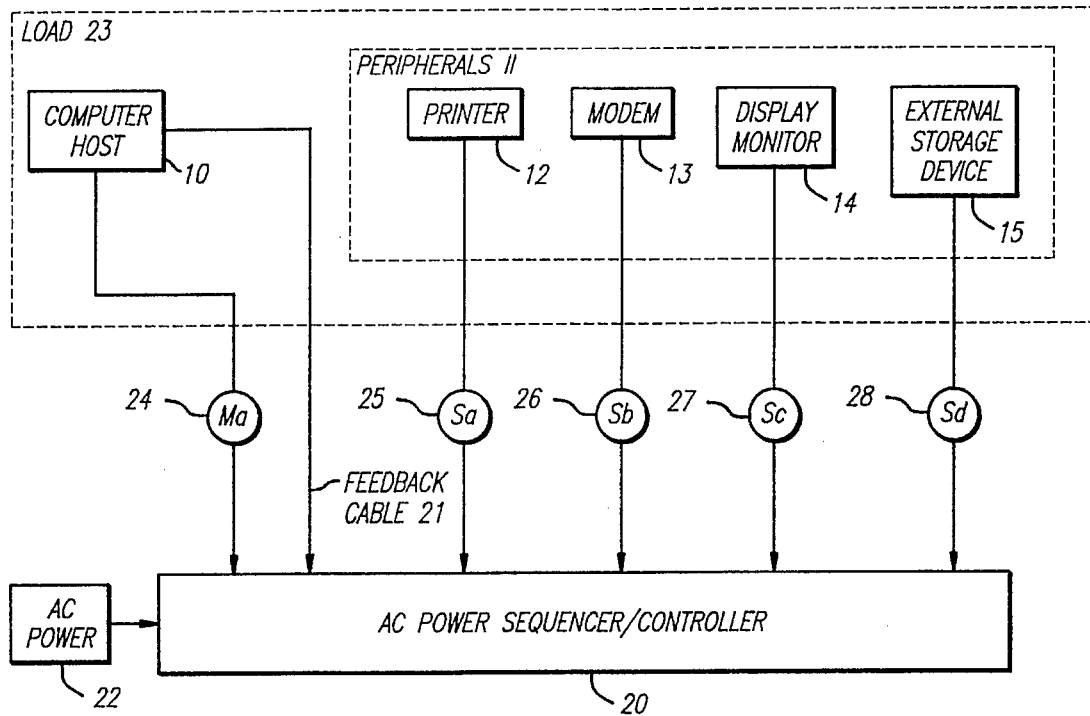
FIG. 1 is a prior art AC power sequencer/controller having a feedback cable between the AC power sequencer/controller and a main load wherein the peripherals are turned on after the AC power sequencer/controller receives a feedback signal from the main load through the feedback cable.
Figure 2A:
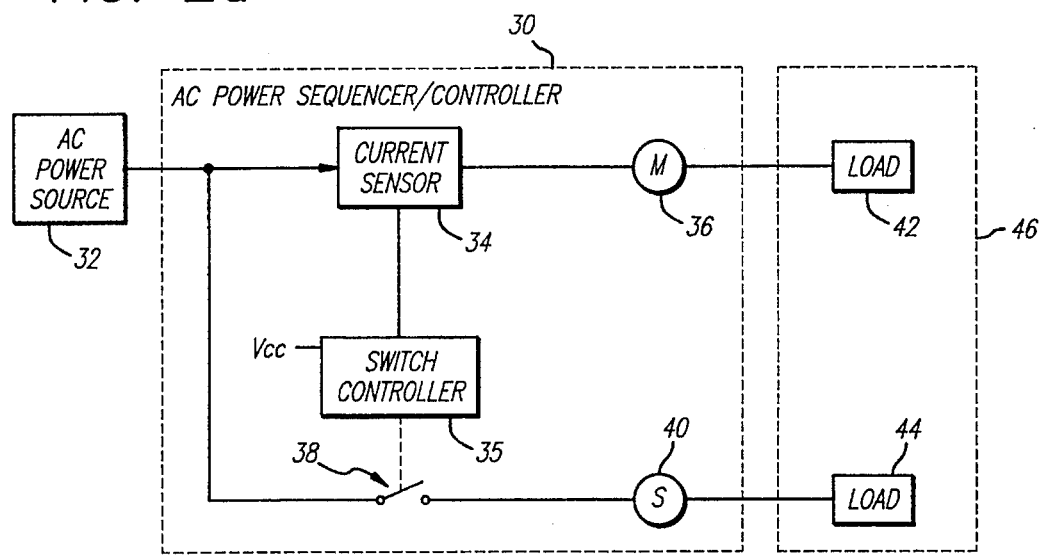

FIG. 2a shows a power sequencer/controller 30 having one master outlet 36 and one slave outlet 40 according to a first embodiment of the present invention. Master outlet 36 is coupled to an AC power source 32, and a load 42, which may be, for example, a computer host. Slave outlet 40 is coupled to another load 44, which may be, for example, a display monitor. Power sequencer/controller 30 further includes a current sensor 34 to sense the current flowing through master outlet 36, a switch 38 that closes and connects AC power source 32 to slave outlet 40 and a switch controller 35 that controls switch 38.

The sequence of a typical operation is as follows: when the current through master outlet 36 exceeds a threshold value (this occurs when load 42 turns on and draws current), switch 38 closes to allow power to be delivered to slave outlet 40, and thus to load 44. Hence, load 44 turns on after load 42 turns on. Loads 42 and 44 can also be turned off in sequence by opening switch 38 when current sensor 34 detects that the current through master outlet 36 has dropped below the threshold value. Although, in the preferred embodiment, the threshold current value for turning on load 44 is identical to the threshold current value for turning off load 44, the threshold values for turning on and off load 44 may be different in another embodiment.

It is also possible to provide power to slave outlet 40 continuously regardless of whether load 42 is on or off by receiving an input from a DC power supply, Vcc. In this instance, switch 38 is closed regardless of the output value from current sensor 34, and slave outlet 40 is powered.

Continuing to refer to FIG. 2a, it will be appreciated that current sensor 34 can adjust or select the threshold current value to accommodate various loads that draw different amounts of current. Current sensor 34 will be discussed in detail with reference to FIGS. 4a and 4b. In the preferred embodiment, current sensor 34 detects the current level through master outlet 36 and outputs a voltage corresponding to the detected current level. In another embodiment, current sensor 34 may detect the current level through master outlet 36 and produce another current level as an output. Thus, the present invention accomplishes power sequencing by sensing the current flowing through the master outlet 36 rather than having a feedback cable connected between power sequencer/controller 30 and load 42, as shown in the prior art.

One Master Outlet and Multiple Slave Outlets

Figure 2B:
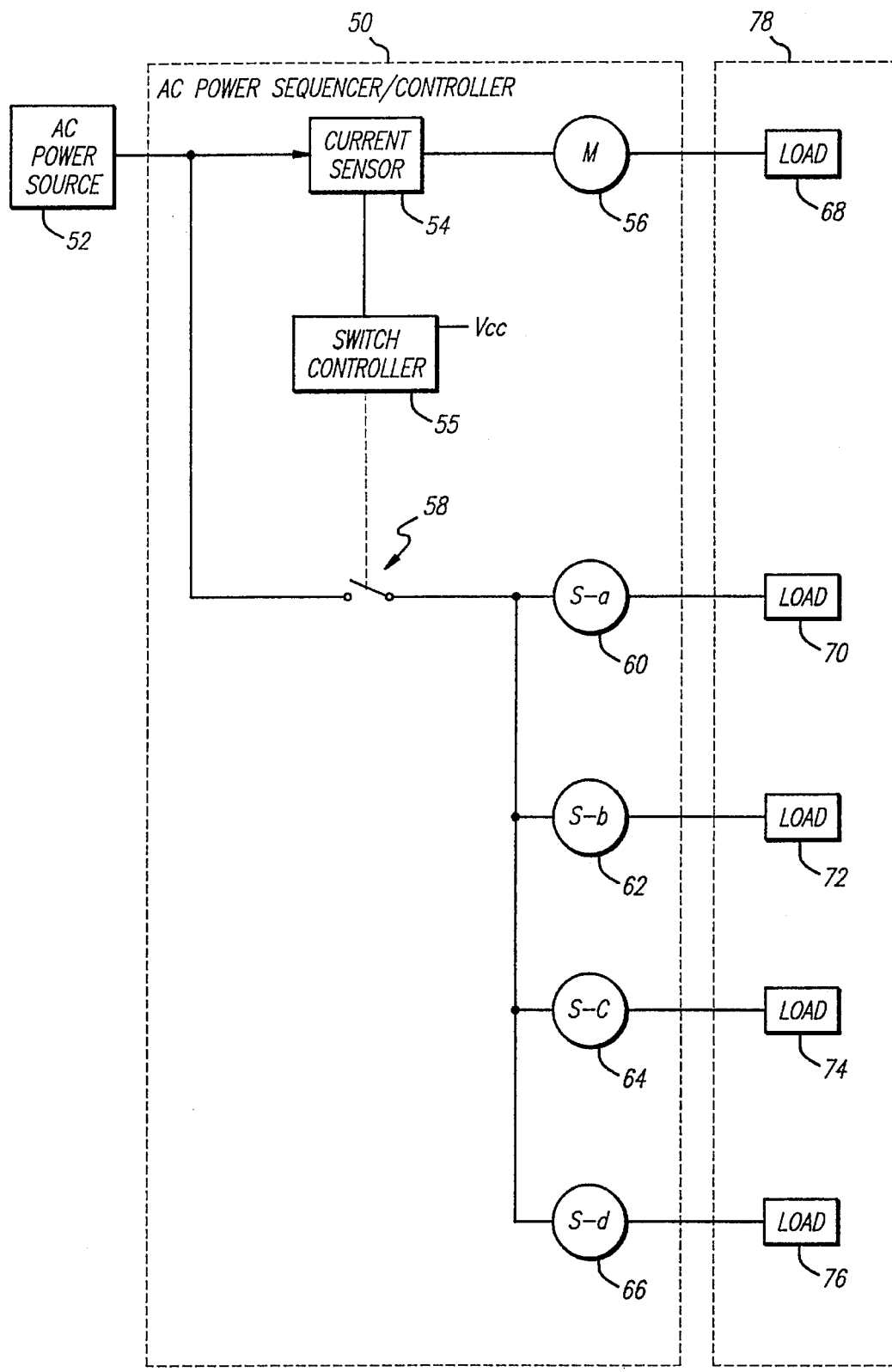
FIG. 2b is a block diagram of an AC power sequencer/controller having one main outlet and multiple slave outlets according to a second embodiment of the present invention.

FIG. 2b shows a power sequencer/controller 50 having one master outlet 56 and multiple slave outlets 60, 62, 64 and 66 according to a second embodiment of the present invention. Each of the outlets are connected to a load. In a typical operation, when the current sensor 54 senses a current that exceeds a threshold level (this occurs when load 68 is turned on), a switch controller 55 closes a switch 58, and power is provided to all of the slave outlets 60, 62, 64 and 66. When the current through master outlet 56 drops below the threshold level (this occurs when load 68 is turned off), switch controller 55 opens switch 58 to disconnect power from slave outlets 60, 62, 64, and 66. If switch controller 55 receives an input from Vcc instead of current sensor 54, then all the slave outlets are powered regardless of the current level through master outlet 56, as described above with reference to FIG. 2a.

Multiple Master Outlets and Multiple Slave Outlets

Figure 2C:
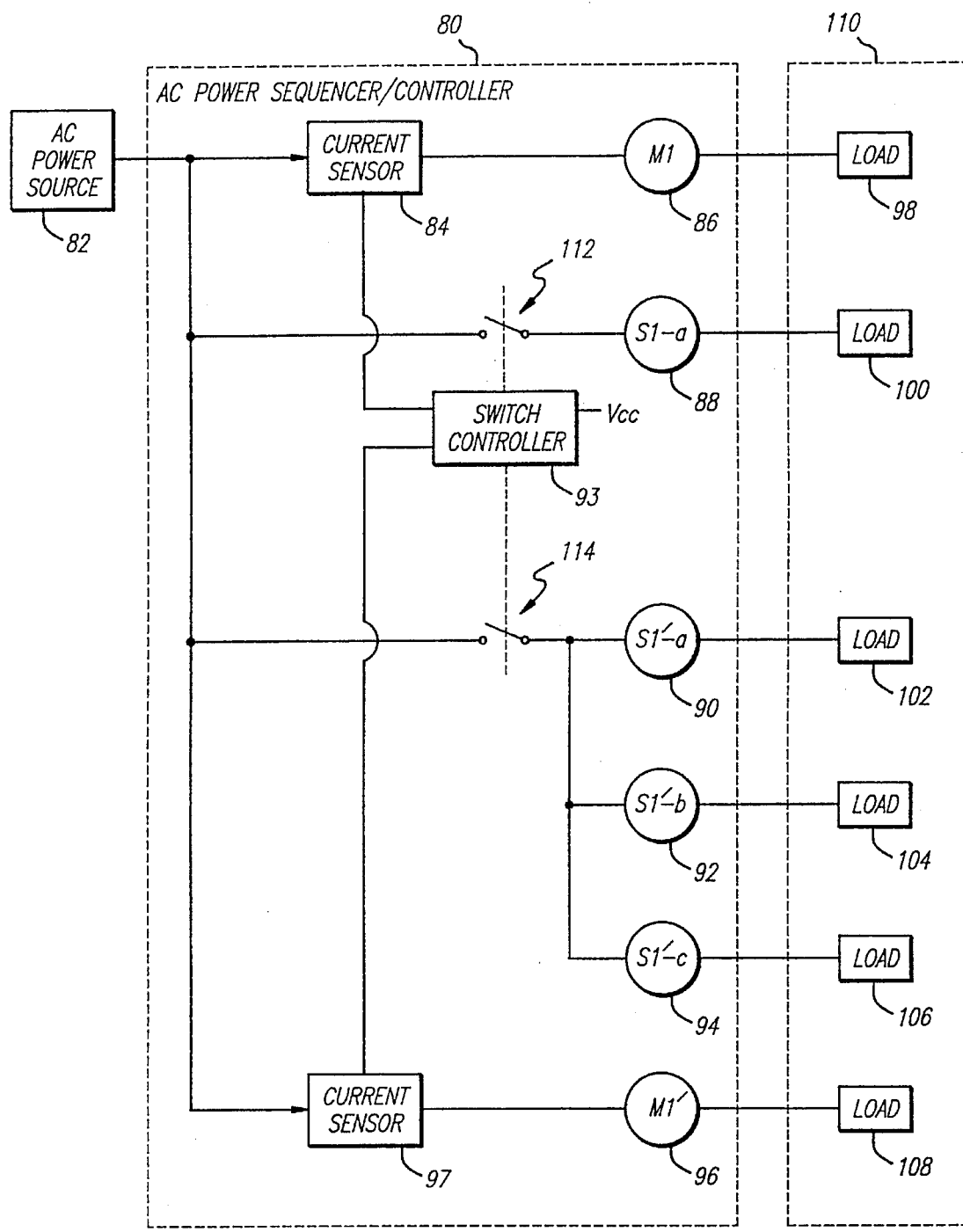
FIG. 2c is a block diagram of an AC power sequencer/controller having multiple main outlets and one or more slave outlets for each main outlet according to a third embodiment of the present invention.

A power sequencer/controller of the present invention may have one or more master outlets and one or more slave outlets. FIG. 2c presents a power sequencer/controller 80 having two master outlets (86 and 96) and one or more slave outlets (88 or 90, 92 and 94) for each master outlet according to a third embodiment of the present invention. While each of master outlets 86 and 96 has a current sensor 84 or 97, respectively, there is provided one switch controller 93 so that any of the slave outlets 88, 90, 92 and 94 can be powered depending on the current level through either of master outlet 86 or master outlet 96. An input from a DC power supply Vcc is also provided to switch controller 93 so that all the slave outlets can be powered regardless of the status of the master outlets as described above.

Various features of a switch controller 93 will be described in detail later with reference to FIGS. 5a–5d, 6 and 7. It should be noted that the threshold current level of each of the current sensors may be different from one another and that the two master outlets are independent such that load 98 and load 108 can be turned on or off independent of each other.

Multiple Cascaded Power Sequencers/Controllers

Figure 2D:
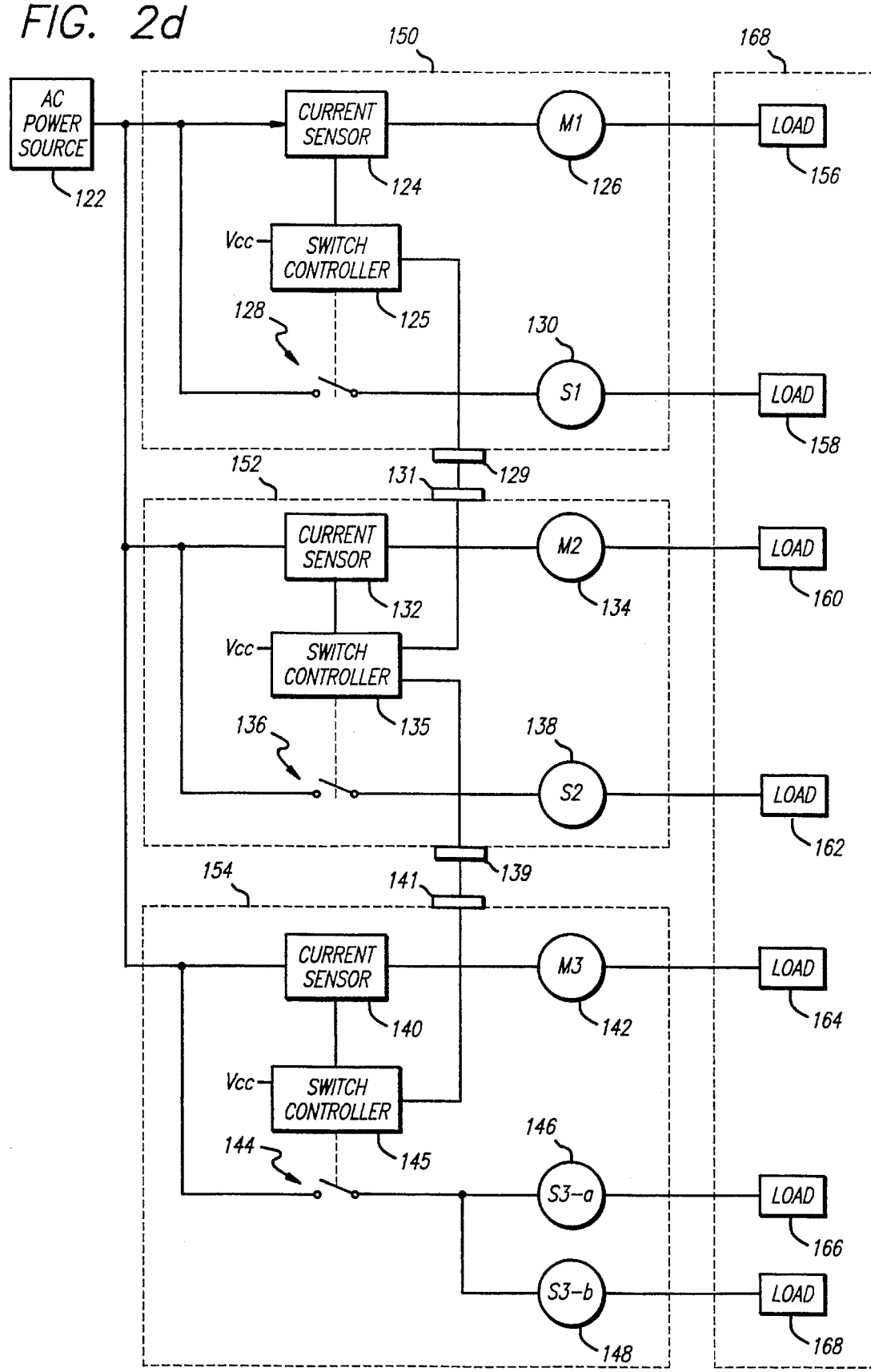
FIG. 2d is a block diagram of a cascaded AC power sequencer/controller system having multiple AC power sequencers/controllers according to a fourth embodiment of the present invention.

The present invention may have a power sequencer/ controller system with multiple cascaded power sequencers/ controllers. FIG. 2d presents three cascaded power sequencers/controllers 150, 152 and 154 according to a fourth embodiment of the present invention. In this example, a slave outlet 138 may be controlled by the current through either of master outlet 126 or master outlet 134. If switch controller 135 selects current sensor 132, then slave outlet 138 is controlled by the current through master outlet 134. If switch controller 135 selects the cascade input 131, then slave outlet 138 is controlled by master outlet 126. Also slave outlet 138 may be controlled by both master outlets 126 and 134. In this instance, both cascade input 131 and current sensor 132 are selected, and slave outlet 138 will be powered if either of the current through master outlet 126 or the current through master outlet 134 exceeds a threshold value.

Continuing to refer to FIG. 2d, it should be noted that the threshold current level of each of the current sensors may be different from each other. In addition, in a cascaded system, the higher order master outlets such as 134 and 142 may be disabled so that the cascaded system provides one master outlet 126 controlling all the slave outlets 130, 138, 146 and 148. In this configuration, the cascaded system in FIG. 2d functions substantially like power sequencer/controller 50 in FIG. 2b.

Slave Outlets Controlled by Other Slave Outlets

Figure 2E:
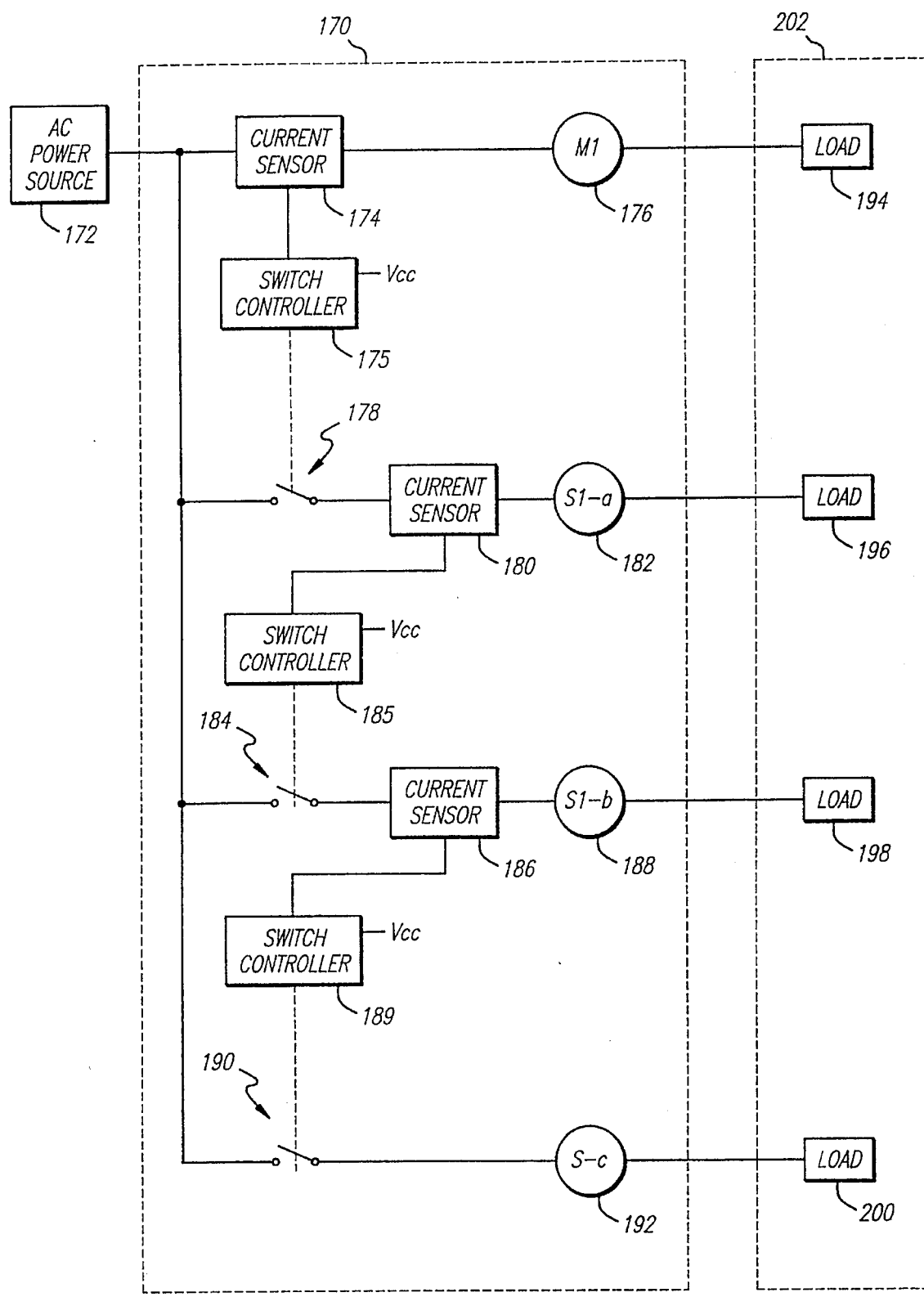
FIG. 2e is a block diagram of an AC power sequencer/controller having one main outlet and multiple slave outlets according to a fifth embodiment of the present invention wherein the slave outlets are controlled by the current through the main outlet or other slave outlets.

While the slave outlets in FIGS. 2a–2d are controlled by the current through a master outlet, a slave outlet can be controlled by the current through another slave outlet. FIG. 2e shows a power sequencer/controller 170 having one master outlet 176 with multiple slave outlets 182, 188 and 192 according to a fifth embodiment of the present invention. In a typical operation, while slave outlet 182 is controlled by the current through master outlet 176, slave outlet 188 is controlled by the current through slave outlet 182 (rather than master outlet 176), and slave outlet 192 is controlled by the current through slave outlet 188.

Continuing to refer to FIG. 2e, in the fifth embodiment, loads 194, 196, 198 and 200 can be turned on and off in sequence. When the current through master outlet 176 exceeds a first current threshold level (load 194 is turned on), switch 178 closes, and power is provided to slave outlet 182. When the current through slave outlet 182 exceeds a second current threshold level (load 196 is turned on), switch 184 closes, and power is provided from AC power source 172 to slave outlet 188. When the current through slave outlet 188 exceeds a third threshold current level (load 198 is turned on), switch 190 closes, and power is provided to slave outlet 192.

Continuing to refer to FIG. 2e, loads 194, 196, 198 and 200 may be turned off using a procedure similar to the one for turning them on. The only difference in the procedure is that various switches are opened and power is disconnected from the slave outlets when the current through the controlling outlet drops below the threshold current level. A sequence of turning off loads 194, 196, 198 and 200 may be illustrated as follows: when the current through master outlet 176 falls below the first current threshold level (load 194 is turned off), switch 178 opens, and power is disconnected from slave outlet 182. When the current through slave outlet 182 falls below the second current threshold level (load 196 is turned off), switch 184 opens, and power is disconnected from slave outlet 188. When the current through slave outlet 188 falls below the third threshold current level (load 198 is turned off), switch 190 opens, power is disconnected from slave outlet 192, and load 200 turns off.

Various Embodiments of Cascaded Power Sequencers/Controllers

Figure 3A:
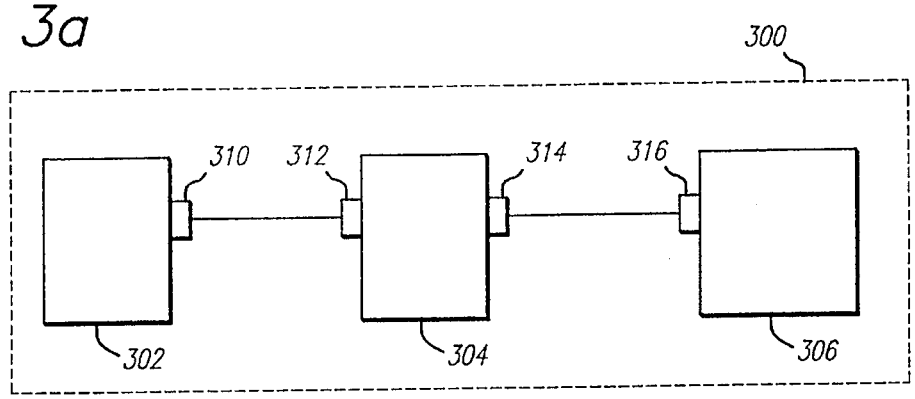
FIG. 3a is a block diagram of a cascaded AC power sequencer/controller system according to one embodiment of the present invention.
Figure 3B:
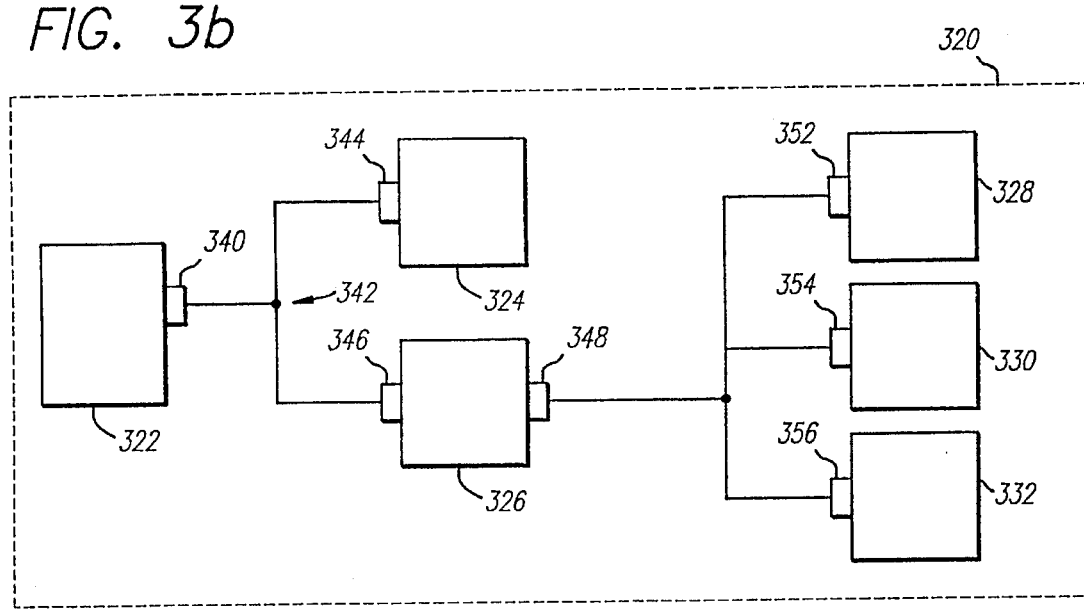
FIG. 3b is a block diagram of a cascaded AC power sequencer/controller system according to another embodiment of the present invention.
Figure 3C:
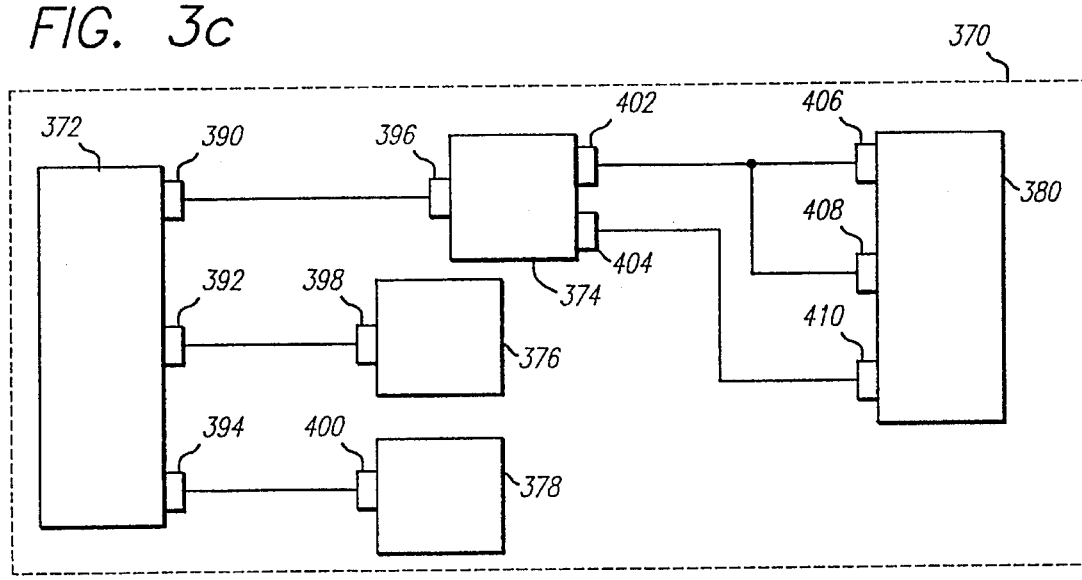
FIG. 3c is a block diagram of a cascaded AC power sequencer/controller system according to yet another embodiment of the present invention.

FIGS. 3a–3c illustrate how multiple power sequencers/ controllers can be connected to one another. Although there may be an infinite number of possible embodiments, FIGS. 3a–3c are provided to illustrate some of them. A first example is depicted in FIG. 3a. A power sequencer/controller system 300 in FIG. 3a includes three cascaded power sequencers/controllers 302, 304 and 306. Each of the power sequencers/controllers has a single cascade input and a single cascade output. Cascade output 310 of power sequencer/controller 302 is connected to cascade input 312 of power sequencer/controller 304, cascade output 314 of power sequencer/controller 304 is connected to cascade input 316 of power sequencer/controller 306 to cascade the various power sequencers/controllers. This configuration is substantially that of FIG. 2d.

A second example shown in FIG. 3b illustrates how a power sequencer/controller can be connected to multiple power sequencers/controllers. In FIG. 3b, a power sequencer/controller system 320 has (a) a first power sequencer/controller 322 coupled to two power sequencers/ controllers 324 and 326 and (b) power sequencer/controller 326 coupled to three others 328, 330 and 332.

A third example in FIG. 3c illustrates how a power sequencer/controller can have multiple cascade outputs and inputs. In FIG. 3c, a power sequencer/controller system 370 has a first power sequencer/controller 372 having three cascade outputs 390, 392 and 394 coupled to cascade inputs 396, 398 and 400 of power sequencers/controllers 374, 376 and 378, respectively. Power sequencer/controller 374 may have two cascade outputs 402 and 404 coupled to three cascade inputs 406, 408 and 410 of a power sequencer/controller 380.

Summary of the Various Embodiments

In summarizing FIGS. 2a–2e and 3a–3c, the present invention may provide one or more master outlets and one or more slave outlets or no slave outlets for each master outlet of a power sequencer/controller. A slave outlet can be configured to be (a) independent of other outlets (that is, power is provided to the slave outlet regardless of whether other loads are turns on or off or whether the current through other outlets have exceeded the threshold current level), (b) controlled by the current through a master outlet or through another slave outlet of the same power sequencer/controller or (c) controlled by the current through a master outlet or through another slave outlet of a second power sequencer/controller. Each of the master outlets are independent of other outlets.

If there are at least three outlets A, B and C with at least one slave outlet (for illustration, assume C is the slave outlet), then a switch controller for slave outlet C can provide power to slave outlet C when the current through either of outlet A or B exceeds a threshold or only when the current through outlet A exceeds a threshold or only when the current through outlet B exceeds a threshold level.

Multiple power sequencers/controllers can be cascaded to one another in various ways so that one or more cascade outputs of a power sequencer/controller can control one or more cascade inputs of one or more power sequencers/ controllers.

PREFERRED EMBODIMENT OF THE PRESENT INVENTION

Figure 4A:
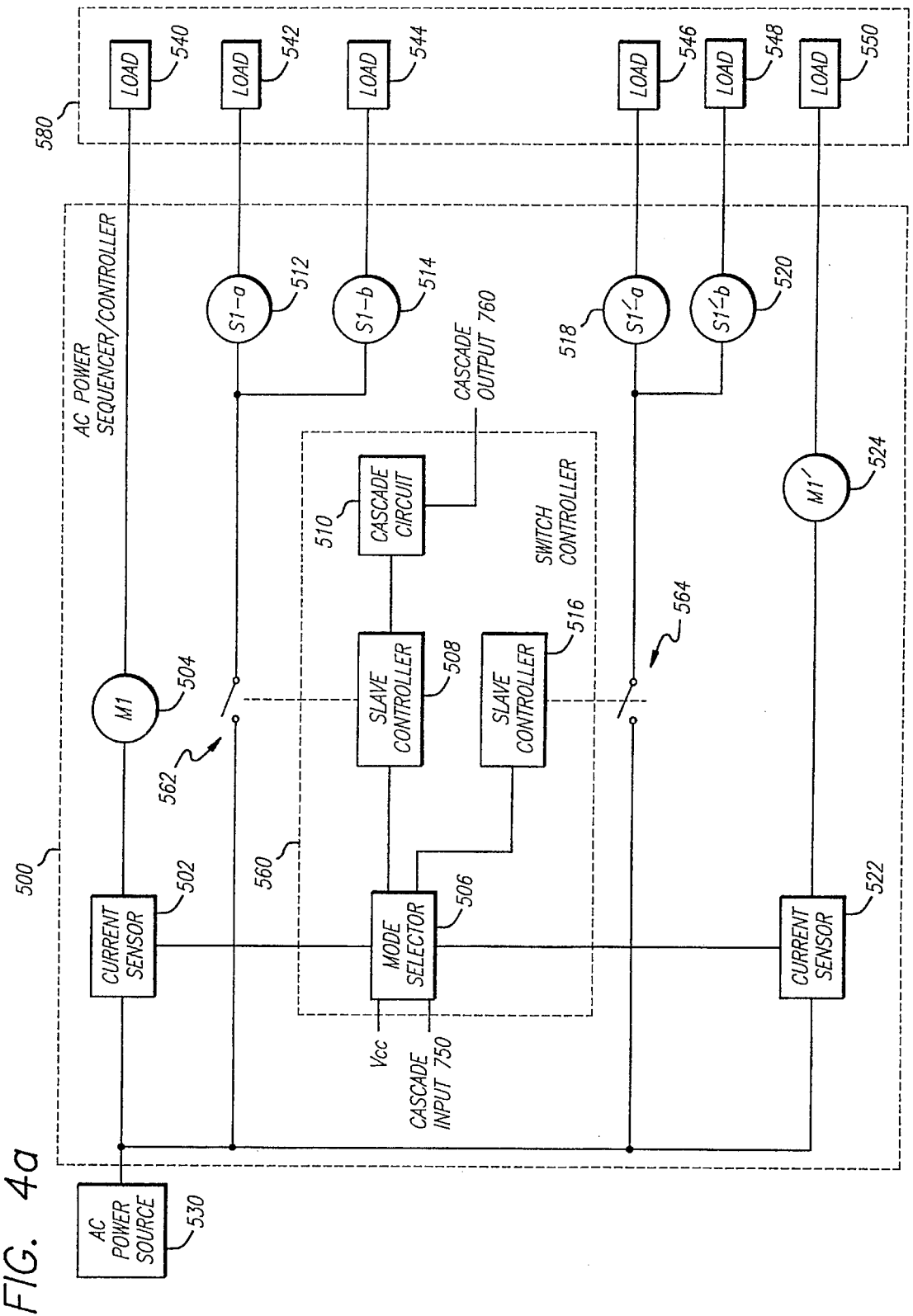
FIG. 4a is a block diagram of an AC power sequencer/controller according to the preferred embodiment of the present invention.

To describe the present invention in detail, a power sequencer/controller having a structure similar to the one in FIG. 2c is depicted in FIGS. 4a and 4b. The details of the functions and circuit structures of the present invention will be described with reference to FIGS. 4a–4c, 5a–5d, 6 and 7.

Block Diagram and Circuit Schematic

A block diagram of a power sequencer/controller 500 is shown in FIG. 4a according to the preferred embodiment of the present invention. FIG. 4b is a circuit schematic showing the various circuit components that are in the block diagram of FIG. 4a. Referring to the FIG. 4a, power sequencer/ controller 500 includes master outlets 504 and 524, slave outlets 512, 514, 518 and 520, current sensors 502 and 522, and a switch controller 560.

Referring now to FIGS. 4a and 4b master outlet 504 is coupled to an AC power source 530 through current sensor 502 and to a load 540. Master outlet 524 is coupled to AC power source 530 through current sensor 522 and to a load 550. Power from AC power source 530 is provided to each of master outlets 504 and 524 as long as fuses 600 and 602 are shorted. It should be noted that fuses 600 and 602 can be replaced by circuit breakers to perform the same function. When load 540 turns on, master outlet 504 draws current which develops a magnetic field in and a voltage across inductor L1 of current sensor 502. When load 550 turns on, master outlet 524 draws current which develops a magnetic field in and a voltage across inductor L1' of current sensor 522. Master outlets 504 and 524 operate independent of each other.

Current Sensor

Referring to FIG. 4b, current sensors 502 and 522 (corresponding to 84 and 97 in FIG. 2c) sense the current through master outlets 504 and 524, respectively. Each current sensor includes a threshold current selector 700 or 706, a current-to-voltage converter 702 or 708, which is an inductor in the preferred embodiment, and a voltage detection/conversion circuit 704 or 710.

A detailed description of threshold current selector 700 is presented below. The following description applies to threshold current selector 706 as well. Threshold current selector 700 sets the threshold current level. In the preferred embodiment, threshold current selector 700 includes resistors R1, R2 and R3 and a switch SW3. When SW3 is connected to R1, a first threshold current level is selected, and when SW3 is connected to R2, a second threshold current level is selected. Another embodiment may include more resistors to provide more selection. If R1 is greater than R2, then R1 provides a low threshold current level, and R2 provides a high threshold current level. Thus, if load 540 draws 200 mA when it is turned on, depending on the values of R1, R2 and R3, SW3 will be switched to R1 or R2 to properly set the threshold value to 200 mA.

Current-to-voltage converter 702 or 708 (which is inductor L1 or L1' in the preferred embodiment) produces a voltage difference across the current-to-voltage converter when current flows in master outlet 504 or 524, respectively.

A voltage detection/conversion circuit 704 in FIG. 4b detects the voltage developed across inductor L1, and sends a voltage signal that is appropriate for switch controller 560 to switch controller 560 when the voltage across inductor L1 exceeds a predetermined voltage level. In one embodiment, voltage detection/conversion circuit 704 may use a commercially available chip such as LM1851 ground fault interrupter manufactured by National Semiconductor Corporation. Voltage circuit 710 functions in a similar manner as voltage detection/conversion circuit 704.

Mode Selector

Continuing to refer to FIG. 4b, switch controller 560 (corresponding to 93 in FIG. 2c) includes a mode selector 506. Mode selector 506 provides different modes of controlling slave outlets 512, 514, 518 and 520 depending on the positions of switches SW1, SW2 and SW1' and SW2'. In the preferred embodiment, SW1 and SW1' are synchronous and dependent of each other, and SW2 and SW2' are synchronous and dependent of each other, meaning that when SW1 is connected to node 1-1, SW1' is connected to node 1-1'. When SW1 is connected to node 1-2, SW1' is connected to node 1-2'. When SW1 is connected to node 1-3, SW1' is connected to node 1-3', and when SW1 is connected to node 1-4, SW1' is connected to node 1-4'. Also, when SW2 is connected to node 2-1, SW2' is connected to node 2-1'. When SW2 is connected to node 2-2, SW2' is connected to node 2-2'. When SW2 is connected to node 2-3, SW2' is connected to node 2-3'. However, in another embodiment, SW1 and SW1' or SW2 and SW2' may be completely independent of each other.

Various Modes of Operation

Table 1 summaries the functions of the positions of switches SW1, SW2 and SW1' and SW2' according to the preferred embodiment. It should be noted while there are many other modes of operation, fourteen different modes are described in this embodiment.

In Table 1, the status of the slave outlets are described with reference to the status of loads 540 and 550. It should be noted that when load 540 is turned on, the current through master outlet 504 exceeds a first threshold current level. When load 540 is turned off, the current through master outlet 504 is below the first threshold current level. When load 550 is turned on, the current through master outlet 524 exceeds a second threshold current level. When load 550 is turned off, the current through master outlet 524 is below the second threshold current level. The first and second threshold current levels may be the same or different values. In Table 1, "x" is a "don't-care" value, and "N/A" means not applicable.

Figure 5A:
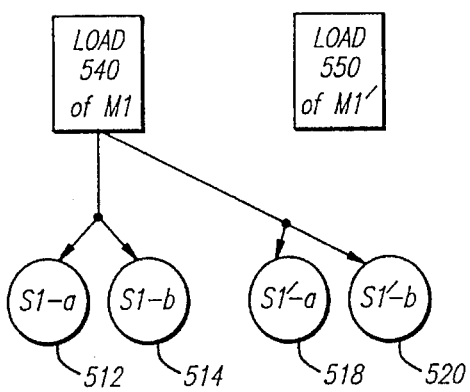
FIG. 5a is a diagram showing load 540 of M1 in FIG. 4b controlling all the slave outlets according to operation modes 1 and 2 in Table 1.

Switches SW2 and SW2' may be in one of three positions. First, modes 1 through 12 are discussed where SW2 and SW2' are connected to nodes 2-2 and 2-2', respectively. In these modes, slave outlets 512, 514, 518 and 520 are controlled by the current through either of master outlet 504 or 524; that is, the slave outlets are controlled by whether either of load 540 or 550 is on or off. In modes 1 and 2, where SW1 and SW1' are connected to nodes 1-1 and 1-1', respectively, load 540 controls all the slave outlets 512, 514, 518 and 520; that is, slave outlets are provided with power only if load 540 is turned on. This is depicted in FIG. 5a.

Figure 5B:
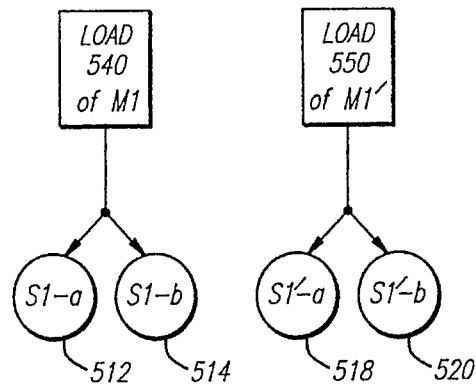
FIG. 5b is a diagram showing each of load 540 of M1 and load 550 of M1' in FIG. 4b controlling its slave outlets according to operation modes 3 through 6 in Table 1.

In modes 3 through 6, where SW1 and SW1' are connected to nodes 1-2 and 1-2', respectively, load 540 controls slave outlets 512 and 514, and load 550 controls slave outlets 518 and 520. Thus, when load 540 is turned on, slave outlets 512 and 514 are powered. When load 540 is turned off, slave outlets 512 and 514 are disconnected from AC power source 530. Similarly, when load 550 is on, slave outlets 518 and 520 are powered, and when load 550 is off, slave outlets 518 and 520 are disconnected from the power. This is depicted in FIG. 5b.

Figure 5C:
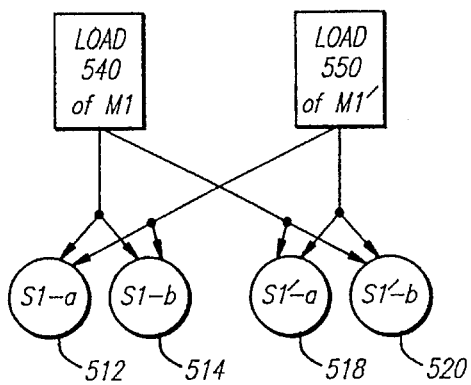
FIG. 5c is a diagram showing slave outlets controlled by any of the loads according to operation modes 7 through 9 in Table 1.

In modes 7 through 9, where SW1 and SW1' are connected to nodes 1-3 and 1-3', respectively, slave outlets 512, 514, 518 and 520 are powered if either load 540 or load 550 is turned on. In mode 7, where load 540 is turned on, slave outlets 512, 514, 518 and 520 are powered regardless of whether load 550 is turned on or off. In mode 8, where load 550 is on, slave outlets 512, 514, 518 and 520 are powered regardless of whether load 550 is on or off. Mode 9 shows that slave outlets 512, 514, 518 and 520 are off only if both loads 540 and 550 are turned off. To perform this OR function, diodes D1 and D2 are provided in FIG. 4b. If load 540 is on, then D1 is on, and both nodes 1-3 and 1-3' are connected to the output ST of voltage detection/conversion circuit 704. If, on the other hand, load 550 is on, then D2 is on, and both nodes 1-3 and 1-3' are connected to the output ST' of voltage detection/conversion circuit 710. If both loads 540 and 550 are off, then neither output ST nor output ST' provides high enough voltage to nodes 1-3 or 1-3' to provide power to slave outlets. The operation of modes 7 through 9 are depicted in FIG. 5c.

Figure 5D:
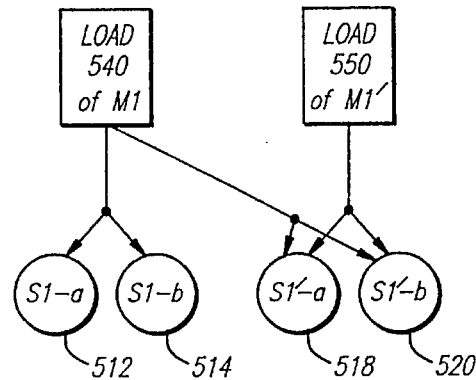
FIG. 5d is a diagram showing load 540 of M1 controlling all the slave outlets and load 550 of M1' controlling its slave outlets according to operation modes 10 through 12 in Table 1.

In modes 10-12, where SW1 an SW1' are connected to nodes 1-4 and 1-4', respectively, load 540 can control all the slave outlets while load 550 controls only slave outlets 518 and 520; in other words, while slave outlets 512 and 514 are controlled by load 540, slave outlets 518 and 520 can be controlled by either load 540 or 550. FIG. 5d illustrates this operation. In FIG. 4b, while node 1-4 is connected to output ST, node 1-4' is connected to outputs ST and ST' through D1 and D2, respectively.

In mode 10, where load 540 is on, all the slave outlets will be powered regardless of whether load 550 is on. In mode 11, where load 540 is off and load 550 is on, slave outlets 512 and 514 will be disconnected from power source 530 since load 540 is off, but slave outlets 518 and 520 will be powered since they are powered if either load 540 or 550 is on. In mode 12, where both loads 540 and 550 are off, all the slave outlets are off.

Figure 6:
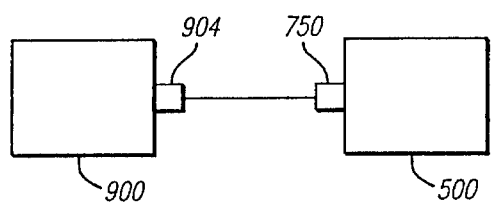
FIG. 6 is a block diagram of a cascaded AC power sequencer/controller system according to operation mode 13 in Table 1.

Second, mode 13 is discussed where SW2 and SW2' are connected to nodes 2-3 and 2-3', respectively, regardless of where SW1 and SW1' are connected. Mode 13 is illustrated in FIG. 6 where power sequencer/controller 500 is cascaded to a second power sequencer/controller 900. In this mode, the slave outlets in power sequencer/controller 500 are controlled by a cascade input 750 which is connected to a cascade output 904 of power sequencer/controller 900. Cascading power sequencers/controllers will be discussed more later with reference to a cascade circuit 510 in FIG. 4b.

Figure 7:
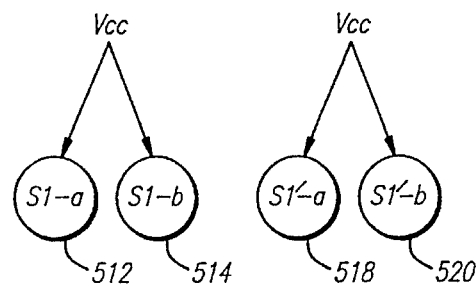
FIG. 7 is a diagram showing that all the slave outlets are powered because the mode selector in FIG. 4b is connected to a DC power supply according to operation mode 14 in Table 1.

Finally, mode 14 occurs when SW2 and SW2' are connected to nodes 2-1 and 2-1', respectively. In mode 14, SW2 and SW2' are connected to a DC power supply Vcc. This is depicted in FIG. 7. In this mode, all the slave outlets 512, 514, 518 and 520 are always powered by power source 530 as long as fuses 604 and 606 are shorted regardless of the status of loads 540 and 550. Thus, in mode 14, power sequencer/controller 500 has six outlets (504, 524, 512, 514, 518 and 520) that are connected to power source 530, and they operate independent of each other.

TABLE 1

| Mode | SW2 | SW1 | SW2' | SW1' | Load 540 | Load 550 | Slave Outlets 512 and 514 Powered? | Slave Outlets 518 and 520 Powered? |
|---|---|---|---|---|---|---|---|---|
| 1 | 2-2 | 1-1 | 2-2' | 1-1' | On | x | Yes | Yes |
| 2 | 2-2 | 1-1 | 2-2' | 1-1' | Off | x | No | No |
| 3 | 2-2 | 1-2 | 2-2' | 1-2' | On | Off | Yes | No |
| 4 | 2-2 | 1-2 | 2-2' | 1-2' | On | On | Yes | Yes |
| 5 | 2-2 | 1-2 | 2-2' | 1-2' | Off | On | No | Yes |
| 6 | 2-2 | 1-2 | 2-2' | 1-2' | Off | Off | No | No |
| 7 | 2-2 | 1-3 | 2-2' | 1-3' | On | x | Yes | Yes |
| 8 | 2-2 | 1-3 | 2-2' | 1-3' | x | On | Yes | Yes |
| 9 | 2-2 | 1-3 | 2-2' | 1-3' | Off | Off | No | No |
| 10 | 2-2 | 1-4 | 2-2' | 1-4' | On | x | Yes | Yes |

TABLE 1-continued

| Mode | SW2 | SW1 | SW2' | SW1' | Load 540 | Load 550 | Slave Outlets 512 and 514 Powered? | Slave Outlets 518 and 520 Powered? |
|---|---|---|---|---|---|---|---|---|
| 11 | 2-2 | 1-4 | 2-2' | 1-4' | Off | On | No | Yes |
| 12 | 2-2 | 1-4 | 2-2' | 1-4' | Off | Off | No | No |
| 13 | 2-3 | x | 2-3' | x | N/A | N/A | Controlled by cascade input | Controlled by cascade input |
| 14 | 2-1 | x | 2-1' | x | N/A | N/A | Yes | Yes |

Slave Controller

Referring back to FIG. 4b, switch controller 560 further includes slave controllers 508 and 516. Since both slave controllers have the same structures and functions, only slave controller 508 is described in detail. Slave controller 508 includes an N-channel MOSFET Q1 that turns on to provide current to relay coil K1 when a capacitor C1 is charged to bring node 1 to above Q1's threshold voltage. The current in relay coil K1, in turn, induces a magnetic field and closes switch 562 to allow power source 530 to deliver power to slave outlets 512 and 514. When transistor Q1 is active, current flows from Vcc through K1 and Q1. When Q1 becomes inactive, no current flows through K1, causing switch 562 to open and disconnecting power from slave outlets 512 and 514. Diode D3 is used to suppress the reversed voltage caused by Q1 being switched off.

Referring to FIG. 4b and Table 1, when mode selector 506 is in one of modes 1 through 12, Q1 is controlled by either of load 540 or 550; in other words, Q1 is controlled by the current through either of master outlet 504 or 524. Referring to FIG. 4b and 6 and Table 1, in mode 13, Q1 is controlled by cascade input 750 which is connected to cascade output 904 of power sequencer/controller 900 so that Q1 is controlled by the loads(s) connected to the master outlet(s) of power sequencer/controller 900. Now referring to FIG. 4b and Table 1, in mode 14, Q1 is always on since the gate (node 1) of Q1 is coupled to Vcc through resistors R5 and R8 and a diode D4, and the voltage at node 1 exceeds the threshold voltage of Q1.

Slave controller 508 also includes a bias circuit having a diode D4, resistors R5 and R4, a capacitor C1 and a zener diode D7. When a voltage signal is sent to slave controller 508 from one of cascade input 750, output ST of voltage detection/conversion circuit 704 or Vcc, C1 is charged using a voltage divider (R4 & R5) until node 1 reaches the divider voltage. C1 also filters noise created in the bias circuit. A zener diode D7 is used to protect Q1. Any excess voltage drop (the voltage at node 2 minus the voltage across D4) is distributed among R5 and D7. C1, R4 and R5 may also function as a delay circuit. If it is desired to delay closing of switch 562, and thus delaying turning on loads 542 and 544, one can use large C1 and appropriate R4 and R5 to create the desired RC time constant.

Cascade Circuit

Switch controller 560 further includes a cascade circuit 510. Although only one cascade circuit 510 is shown in this embodiment, another cascade circuit can be attached to slave controller 516. Cascade circuit 510 has a P-channel MOSFET Q2 that turns on if Q1 turns on, and turns off if Q1 is off. When Q1 is on, a zener diode D5 fixes the gate voltage of Q2 to the zener diode breakdown voltage of D5, and any excess voltage (Vcc minus the voltage drop across D5 and Q1) is dropped across a resister R6.

When Q2 is on and if cascade output 760 is connected to a cascade input of a second power sequencer/controller, the signal from cascade output 760 will turn on a Q1 in the second power sequencer/controller. Cascade output 760 may represent any of 129 or 139 in FIG. 2d and any of 310, 314, 340, 348, 390, etc. in FIGS. 3a–3c. Thus, in a cascaded system, a cascade output such as 760 of a power sequencer/controller in a first stage is connected to a cascade input such as 750 of a power sequencer/controller in a second stage so that the slave outlets in the second stage can be controlled by the load(s) in the first stage.

In other embodiments, Q1 and Q2 may be of other types of transistors including, but not limited to, JFETs and bipolar transistors.

Application to Other Embodiments

Various components such as current sensor 502, mode selector 506, slave controller 508, cascade circuit 510 may be implemented in various other embodiments including, but not limited to, the ones shown in FIGS. 2a–2e and 3a–3c. In an embodiment such as the ones shown in FIGS. 2a and 2b, where there are only one master outlet, a switch controller will not need a second slave controller. Also a mode selector in FIGS. 2a and 2b would only need to choose among a master outlet, Vcc and a cascade input in controlling the slave outlet(s).

An embodiment such as the one shown in FIG. 2e can implement a current sensor such as 502 in FIG. 4b for 180 in FIG. 2e, and a switch controller 185 in FIG. 2e may include a slave controller such as 508 of FIG. 4b, a cascade circuit such as 510 in FIG. 4b and a mode selector that chooses among S1-a 182, Vcc and a cascade input.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention as disclosed herein.

What is claimed is:

1. A power sequencing and controlling circuit comprising:
   a first electrical outlet for coupling to a first load;
   a first current sensor having first, second and third sensor ends, said first sensor end for coupling to a power source, said second sensor end coupled to said first electrical outlet, said first current sensor sensing current through said first electrical outlet;
   a switch controller coupled to said third sensor end, said switch controller receiving a signal from one of a plurality of inputs, said inputs including said first current sensor, a DC Dower supply and a second Dower sequencing and control circuit;

a switch having first and second switch ends, said switch being controlled by said switch controller, said first switch end for coupling to said power source; and a second electrical outlet coupled to said second switch end, said second electrical outlet for coupling to a second load.

2. The power sequencing and controlling circuit of claim 1 wherein said current sensor detects whether the current through said first electrical outlet exceeds a threshold current level;

said threshold current level is adjustable; and when said switch closes, power is delivered from said power source to said second electrical outlet.

3. The power sequencing and controlling circuit of claim 1 for one of a computer system and a server system.

4. The power sequencing and controlling circuit of claim 1 wherein when said switch controller receives the signal from said DC power supply, said switch is closed, and said second electrical outlet is powered;

when said switch controller receives the signal from said second power sequencing and controlling circuit, the signal of said second power sequencing and controlling circuit controls closing and opening of said switch;

when said switch controller receives the signal from said first current sensor and when the current through said first electrical outlet exceeds a threshold current level, said switch closes, and said second electrical outlet is powered;

when said switch controller receives the signal from said first current sensor and when the current through said first electrical outlet is below a second threshold current level, said switch is open, and said second electrical outlet is not powered;

when said first load is on, the current through said first electrical outlet exceeds the threshold current level; and when said first load is off, the current through said first electrical outlet is below the second threshold current level.

5. The power sequencing and controlling circuit of claim 1 wherein said first current sensor comprises:

a first circuit that adjusts a threshold current level;

a second circuit that converts the current to a voltage for measurement, said second circuit coupled to said first circuit and to said first electrical outlet; and a third circuit that receives and measures the voltage from said second circuit and produces a second voltage signal, said third circuit coupled to said second circuit and to said switch controller.

6. The power sequencing and controlling circuit of claim 1 wherein said switch controller comprises:

a first selector circuit that selects a mode of operation for said switch controller, said first selector circuit coupled to said DC power supply, said current sensor and an input port for receiving a signal from said second power sequencing and controlling circuit;

a second selector circuit that closes and opens said switch, said second selector circuit coupled to said first switch control circuit.

7. The power sequencing and controlling circuit of claim 6 wherein said switch controller further comprises a signaling circuit that provides an output signal for a third power sequencing and controlling circuit.

8. The power sequencing and controlling circuit of claim 6 wherein said second selector circuit includes:

a first transistor coupled to ground;

a bias circuit for biasing said first transistor, said bias circuit coupled to said first selector circuit and to said first transistor, said bias circuit including a delay circuit for delaying opening and closing of said switch; and an inductor that develops a magnetic field from the current flowing through said inductor when said first transistor is on and that uses the magnetic field to close said switch, said inductor for coupling to said DC power supply and coupled to said first transistor.

9. The power sequencing and controlling circuit of claim 7 wherein said signaling circuit includes:

a second transistor coupled to said first transistor through a resistor and for coupling to said DC power supply, said second transistor turns on when said first transistor is on and turns off when said first transistor is off; and an output port for sending said signal to said third power sequencing and controlling circuit, said output port coupled to said second transistor through a resistor.

10. The power sequencing and controlling circuit of claim 1 further comprising:

a third electrical outlet for coupling to a third load;

a second current sensor having fourth, fifth and sixth sensor ends, said fourth sensor end for coupling to said power source, said fifth sensor end coupled to said third electrical outlet, and said sixth sensor end coupled to said switch controller, said second current sensor sensing current through said third electrical outlet;

a second switch having third and fourth switch ends, said third switch end for coupling to said power source, said second switch being controlled by said switch controller; and a fourth electrical outlet coupled to said fourth switch end, said fourth electrical outlet for coupling to a fourth load.

11. The power sequencing and controlling circuit of claim 10 wherein said switch controller receives a signal from at least one of (a) said first current sensor, (b) said second current sensor, (c) a DC power supply, and (d) a second power sequencing and controlling circuit;

wherein said first and third electrical outlets are powered;

wherein said switch controller includes a plurality of switches so that said power sequencing and controlling circuit operates in a selected one of the following modes:

(a) when the current through said first electrical outlet exceeds a first threshold current level, said second and fourth electrical outlets are powered;

(b) when the current through said first electrical outlet is below a second threshold current level, said second and fourth electrical outlets are not powered;

(c) when the current through said first electrical outlet exceeds the first threshold current level and when the current through said third electrical outlet is below a third threshold current level, said second electrical outlet is powered, and said fourth electrical outlet is not powered;

(d) when the current through said first electrical outlet exceeds the first threshold current level and when the current through said third electrical outlet exceeds a fourth threshold current level, said second and fourth electrical outlets are powered;

(e) when the current through said first electrical outlet is below the second threshold current level and when the current through said third electrical outlet exceeds the fourth threshold current level, said second electrical outlet is not powered, and said fourth electrical outlet is powered;

(f) when the current through said first electrical outlet is below the second threshold current level and when the current through said third electrical outlet is below the third threshold current level, said second and fourth electrical outlets are not powered;

(g) when the current through said third electrical outlet exceeds the fourth threshold current level, said second and fourth electrical outlets are powered;

(h) when said switch controller's input port is coupled to a second power sequencing and controlling circuit, said switch and said second switches are controlled by a signal coming from said second power sequencing and controlling circuit and (i) when said switch controller selects to receive a signal from a DC power supply, said second and fourth electrical outlets are powered.

12. A power sequencing and controlling circuit comprising:

a first electrical outlet for coupling to a first load;

a first current sensor having first, second and third sensor ends, said first sensor end for coupling to a power source, said second sensor end coupled to said first electrical outlet, said current sensor sensing current through said first electrical outlet;

a first switch controller coupled to said third sensor end;

a first switch having first and second switch ends, said first switch end for coupling to said power source, said first switch being controlled by said first switch controller;

a second electrical outlet for coupling to a second load;

a second current sensor having fourth, fifth and sixth sensor ends, said fourth sensor end coupled to said second switch end, said fifth sensor end coupled to said second electrical outlet, said second current sensor sensing current through said second electrical outlet;

a second switch controller coupled to said sixth sensor end;

a second switch having third and fourth switch ends, said third switch end for coupling to said power source, said second switch being controlled by said second switch controller; and a third electrical outlet coupled to said fourth switch end, said third electrical outlet for coupling to a third load.

13. A method for operating a power sequencing and controlling circuit comprising the steps of:

sensing current through a first electrical outlet; and providing power to a second electrical outlet when the current through said first electrical outlet exceeds a threshold current level.

14. The method of claim 13 wherein said first electrical outlet is in said power sequencing and controlling circuit, and said second electrical outlet is in said second power sequencing and controlling circuit.

15. The method of claim 13 further comprising:

sensing current through said second electrical outlet; and providing power to a third electrical outlet when the current through said second electrical outlet exceeds a second threshold current level.

16. A method for operating a power sequencing and controlling circuit comprising the steps of:

sensing current through a first electrical outlet;

selecting a signal from (a) a first current sensor coupled to said first electrical outlet, (b) a power supply, or (c) an input port coupled to a second power sequencing and controlling circuit; and closing a switch coupled to a second electrical outlet when said signal turns on a circuit that controls said switch; and providing power to said second electrical outlet when said switch closes wherein when said signal is from said DC power supply, the step of sensing the current through said first electrical outlet is not needed.

17. The method of claim 16 wherein the step of sensing the current includes a step of sensing current through a third electrical outlet.

18. The method of claim 17 wherein said signal is selected from (a) said first current sensor, (b) a second current sensor coupled to said third electrical outlet, (c) said power supply or (d) said input port.

19. The method of claim 16 wherein said first electrical outlet is in said second power sequencing and controlling circuit.

* * * * *

UNITED STATES PATENT AND TRADEMARK OFFICE
CERTIFICATE OF CORRECTION

PATENT NO. : 5,563,455
DATED : October 8, 1996
INVENTOR(S) : Cheng

It is certified that error appears in the above-identified patent and that said Letters Patent is hereby corrected as shown below:

Column 13,
Line 1, please delete "a DC Dower supply and a second Dower" and insert -- a DC power supply and a second power --.

Signed and Sealed this

Second Day of April, 2002

Attest:

JAMES E. ROGAN
*Attesting Officer*     *Director of the United States Patent and Trademark Office*